US010436528B2

(12) United States Patent
Fukumoto et al.

(10) Patent No.: US 10,436,528 B2
(45) Date of Patent: Oct. 8, 2019

(54) ALUMINUM ALLOY BRAZING SHEET AND METHOD FOR PRODUCING SAME

(71) Applicant: UACJ Corporation, Tokyo (JP)

(72) Inventors: Atsushi Fukumoto, Tokyo (JP); Akio Niikura, Tokyo (JP)

(73) Assignee: UACJ Corporation, Tokyo (JP)

( * ) Notice: Subject to any disclaimer, the term of this patent is extended or adjusted under 35 U.S.C. 154(b) by 575 days.

(21) Appl. No.: 14/902,592

(22) PCT Filed: Jun. 12, 2014

(86) PCT No.: PCT/JP2014/003139
§ 371 (c)(1),
(2) Date: Jan. 3, 2016

(87) PCT Pub. No.: WO2015/001725
PCT Pub. Date: Jan. 8, 2015

(65) Prior Publication Data
US 2016/0169600 A1   Jun. 16, 2016

(30) Foreign Application Priority Data

Jul. 5, 2013 (JP) .................................. 2013-141981

(51) Int. Cl.
*B32B 15/01* (2006.01)
*F28F 21/08* (2006.01)
(Continued)

(52) U.S. Cl.
CPC ............ *F28F 21/084* (2013.01); *B23K 31/02* (2013.01); *B23K 35/0238* (2013.01);
(Continued)

(58) Field of Classification Search
None
See application file for complete search history.

(56) References Cited

U.S. PATENT DOCUMENTS

| 6,261,706 | B1 | 7/2001 | Fukuda et al. | |
| 8,247,084 | B2* | 8/2012 | Kimura | B23K 35/28 |
| | | | | 148/535 |
| 2011/0287277 | A1* | 11/2011 | Kimura | B23K 35/28 |
| | | | | 428/555 |

FOREIGN PATENT DOCUMENTS

| CN | 101358311 | 2/2009 |
| JP | H07-179971 | 7/1995 |

(Continued)

OTHER PUBLICATIONS

"International Search Report (Form PCT/ISA/210) of PCT/JP2014/003139", dated Aug. 26, 2014, with English translation thereof, pp. 1-5.

(Continued)

*Primary Examiner* — Daniel J. Schleis
(74) *Attorney, Agent, or Firm* — JCIPRNET (57) ABSTRACT

An aluminum alloy brazing sheet which is thin but has excellent weldability and post-brazing strength. An aluminum alloy brazing sheet having a core material comprising an aluminum alloy, an Al—Si based brazing filler metal clad on one surface of the core material and a sacrificial anode material clad on the other surface of the core material: wherein the core material comprises certain amounts of Si, Fe, Cu and Mn and certain amounts of one, two or more selected from Ti, Zr, Cr and V; the sacrificial anode material comprises certain amounts of Si, Fe, Mg and Zn; in a cross section parallel to the longitudinal direction and along the thickness direction, the interface between the core material and the sacrificial anode material includes 300 pieces/mm or less of an Al—Mg—Cu based intermetallic compound; and the core material and the sacrificial anode material have an unrecrystallized structure.

8 Claims, 1 Drawing Sheet

(51) Int. Cl.
*C22C 21/00* (2006.01)
*C22F 1/04* (2006.01)
*C22C 21/08* (2006.01)
*C22C 21/10* (2006.01)
*B23K 31/02* (2006.01)
*B23K 35/02* (2006.01)
*B23K 35/28* (2006.01)
*C21D 1/26* (2006.01)
*C22C 21/02* (2006.01)
*C22C 21/14* (2006.01)
*C22C 21/16* (2006.01)
*C22F 1/043* (2006.01)
*C22F 1/057* (2006.01)
*F28F 3/00* (2006.01)
*B23K 35/22* (2006.01)
*C22F 1/00* (2006.01)

(52) U.S. Cl.
CPC .......... *B23K 35/286* (2013.01); *B23K 35/288* (2013.01); *C21D 1/26* (2013.01); *C22C 21/00* (2013.01); *C22C 21/02* (2013.01); *C22C 21/08* (2013.01); *C22C 21/10* (2013.01); *C22C 21/14* (2013.01); *C22C 21/16* (2013.01); *C22F 1/04* (2013.01); *C22F 1/043* (2013.01); *C22F 1/057* (2013.01); *F28F 3/00* (2013.01); *B23K 35/22* (2013.01); *B23K 35/28* (2013.01); *C22F 1/00* (2013.01); *Y10T 428/12764* (2015.01)

(56) References Cited

FOREIGN PATENT DOCUMENTS

| JP | 2001-170793 | | 6/2001 |
|----|-------------|---|--------|
| JP | 2004-17116 | | 1/2004 |
| JP | 2009-022981 | | 2/2009 |
| JP | 2009-024221 | | 2/2009 |
| JP | 2009024221 | * | 2/2009 |
| JP | 2010-209445 | | 9/2010 |
| JP | 2011-241439 | | 12/2011 |
| JP | 2011-241440 | | 12/2011 |
| JP | 2013-129860 | | 7/2013 |

OTHER PUBLICATIONS

"Notification of Reasons for Refusal of Japan Counterpart Application", with English translation thereof, dated Sep. 20, 2016, p. 1-p. 8.

"Second Office Action of China Counterpart Application" with English translation thereof, dated Mar. 10, 2017, p. 1-p. 17.

"Office Action of China Counterpart Application" with machine English translation, dated Aug. 9, 2016, p. 1-p. 17.

"Office Action of China Counterpart Application," with English translation thereof, dated Sep. 25, 2017, p. 1-p. 18.

* cited by examiner

FIG. 1

ALUMINUM ALLOY BRAZING SHEET AND METHOD FOR PRODUCING SAME

CROSS-REFERENCE TO RELATED APPLICATION

This application is a 371 of international application of PCT application serial no. PCT/JP2014/003139, filed on Jun. 12, 2014, which claims the priority benefit of Japan Patent Application no. 2013-141981, filed on Jul. 5, 2013. The entirety of each of the above-mentioned patent applications is hereby incorporated by reference herein and made a part of this specification.

TECHNICAL FIELD

The present invention relates to an aluminum alloy brazing sheet which is used for a heat exchanger of an automobile and the like and a method for producing same. Specifically, the invention relates to an aluminum alloy brazing sheet which is preferably used as a material (a tube material) constituting a path of a coolant or a refrigerant in a heat exchanger and which is especially used for high frequency resistance welding for producing a flat tube by high frequency resistance welding and a method for producing same.

BACKGROUND ART

Since aluminum alloys are light and have high thermal conductivity, aluminum alloys are used for automobile heat exchangers such as radiators, condenser, evaporators, heaters or intercoolers. An automobile heat exchanger is mainly produced by a brazing method, and brazing is generally conducted using a brazing filler metal of an Al—Si based alloy at a high temperature around 600° C.

Various methods are employed as the brazing method. For example, a brazing method using a fluoride flux, which is a non-corrosive flux, in $N_2$ gas is generally employed.

A three-layer tube material which includes an Al—Mn based alloy, typified by JIS3003 alloy, or the like as the core material has been generally used as a tube material in a heat exchanger in which a coolant circulates inside the tube, as in an automobile radiator or heater. Such a three-layer tube material is obtained for example by cladding a sacrificial anode material such as an Al—Zn alloy on the inner surface of a core material of JIS3003 alloy and cladding a brazing filler metal such as an Al—Si based alloy on the outer surface.

In a method for producing a tube used for a radiator or a heater, the end faces of a three-layer tube material are butted and continuously welded while fabricating the material into a tube, and after cutting and removing beads at the welded joints, the resulting tube is fabricated flat, thereby obtaining a flat tube.

Here, as the demand for lighter automobiles has been increasing recently, ways to reduce the weights of automobile heat exchangers and to reduce the thicknesses of respective parts constituting a heat exchanger have been investigated. In order to reduce the thicknesses of the parts, a material which has superior post-brazing strength and corrosion resistance to those of the conventional materials is needed.

Means for improving the strength include a method for improving the strength by adding Si and Cu in high amounts to the core material and a method for improving the strength by adding Mg to the sacrificial anode material. However, problems of quality, such as weld cracking, are more likely to arise during welding, due to the thickness reduction and the improvement of the strength, and a tube material with excellent weldability is desired.

For example, PTL 1 proposes an aluminum alloy brazing sheet strip in which the distribution of $Mg_2Si$ compounds formed around the core material/sacrificial anode material interface is defined to restrict local melting during welding. In addition, an aluminum alloy clad material in which the structure of the core material and the tensile strength of the clad material are defined is proposed in PTL 2 for example.

The weldability can be improved by the means to some extent. However, when the concentrations of the elements such as Mg and Cu, which are added to the core material and the sacrificial anode material to make the material thin and to obtain a high-strength material, at the grain boundaries are high, problems arise because the melting point of the grain boundaries decreases and the grain boundaries melt earlier during welding. When welding is conducted with many Al—Mg—Cu based intermetallic compound existing at the interface between the core material and the sacrificial material, there are also problems because the intermetallic compound melts earlier and the sacrificial material peels off. Therefore, it cannot be considered that the weldability is secured enough with the conventional techniques, and further improvement of the weldability of a thin/high-strength material is desired.

As described above, it has been difficult with the conventional techniques to provide a material which is thin but has excellent weldability and which has improved post-brazing strength.

CITATION LIST

Patent Literature

PTL 1: JP-A-H7-179971
PTL 2: JP-A-2001-170793

SUMMARY OF INVENTION

Technical Problem

The invention has been made in view of the problems and aims to provide an aluminum alloy brazing sheet for electric resistance welding which has excellent weldability and post-brazing strength and which can be preferably used especially as a material constituting a fluid path for an automobile heat exchanger.

Solution to Problem

In order to achieve the aim, in claim 1 of the invention, an aluminum alloy brazing sheet having a core material comprising an aluminum alloy, an Al—Si based brazing filler metal clad on one surface of the core material and a sacrificial anode material clad on the other surface of the core material, wherein the core material comprises an aluminum alloy comprising Si:0.2-1.0 mass %, Fe:0.05-0.40 mass %, Cu:0.4-1.2 mass %, Mn:0.3 to 1.8 mass %, one, two or more selected from Ti:0.02-0.30 mass %, Zr:0.02-0.30 mass %, Cr:0.02-0.30 mass % and V:0.02-0.30 mass % and a balance of Al and unavoidable impurities; the sacrificial anode material comprises an aluminum alloy comprising Si:0.05-0.50 mass %, Fe:0.01-0.30 mass %, Mg:1.0-3.0 mass %, Zn:2.0-6.0 mass % and a balance of Al and unavoidable impurities; in a cross section parallel to the longitudinal direction and along the thickness direction, the interface between the core material and the sacrificial anode material includes 300 pieces/mm or less of an Al—Mg—Cu based intermetallic compound; and the core material and the sacrificial anode material have an unrecrystallized structure.

In claim 2 of the invention, the core material further comprises Mg:0.05-0.60 mass % in claim 1.

In claim 3 of the invention, the sacrificial anode material further comprises at least one of Ti:0.02-0.30% and V:0.02-0.30% in claim 1 or 2.

In claim 4 of the invention, the 0.2% proof stress is 140-200 N/mm², and the elongation percentage is 5% or more in any one of claims 1 to 3.

In claim 5 of the invention, a method for producing the aluminum alloy brazing sheet according to any one of claims 1 to 4 comprising a step of casting the aluminum alloys for the core material, the sacrificial anode material and the brazing filler metal, respectively, a cladding step of cladding the sacrificial anode material on one surface of the core material and cladding the brazing filler metal on the other surface, a step of heating a clad material, a hot rolling step, a cold rolling step and an annealing step: wherein the annealing step includes both of intermediate annealing during the cold rolling step and final annealing after the cold rolling step, or only of the final annealing; a finish temperature of the hot rolling step is 200-320° C.; and annealing temperatures of the intermediate annealing and the final annealing are 230-320° C. in the case of batch annealing and are 250-400° C. in the case of continuous annealing.

In claim 6 of the invention, the annealing of the intermediate annealing and the final annealing is batch annealing in claim 5.

In claim 7 of the invention, the annealing holding time for the batch annealing is 1-10 hours in claim 5 or 6.

In claim 8 of the invention, the annealing holding time for the continuous annealing is 0-50 seconds in claim 5.

In claim 9 of the invention, the method further comprises a homogenization treatment step of homogenizing an ingot of the core material at 550° C. or lower in any one of claims 5 to 8.

In claim 10 of the invention, the clad material is heated at 400-550° C. for 1-10 hours before the hot rolling step in any one of claims 5 to 9.

In claim 11 of the invention, a start temperature of the hot rolling step is 400-530° C. in any one of claims 5 to 10.

Advantageous Effects of Invention

According to the invention, an aluminum alloy brazing sheet which is thin but has excellent weldability and post-brazing strength can be obtained. The brazing sheet is thin, and the brazing sheet is light and has excellent thermal conductivity as a heat exchanger for an automobile and the like. Also, the post-brazing strength is excellent. Therefore, the lifetime of a heat exchanger can be further prolonged.

DESCRIPTION OF EMBODIMENTS

The present inventors have conducted intensive studies on the problems, and as a result, the inventors have found that a clad material having specific alloy compositions and structure achieves the aim and completed the invention based on the findings. An embodiment of the invention is specifically explained below.

First, the structure of the aluminum alloy brazing sheet of the embodiment is explained. The structure is explained below with an example which is used for a tube material of a radiator, a heater or the like in which a coolant or a refrigerant circulates for example.

Figure 1:
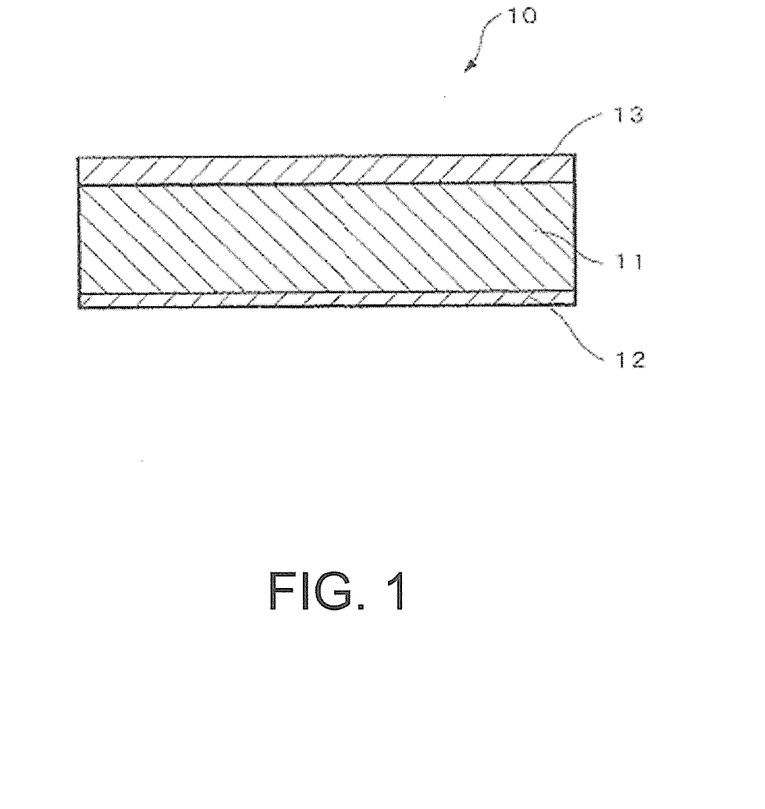
FIG. 1 A cross-sectional view of the aluminum alloy brazing sheet according to the invention.

As shown in FIG. 1, an aluminum alloy brazing sheet 10 according to the invention is a three-layer clad material having a core material 11 comprising an aluminum alloy, an Al—Si based brazing filler metal 12 clad on one surface thereof and a sacrificial anode material 13 clad on the other surface of the core material 11. The cladding rates of the brazing filler metal 12 and the sacrificial anode material 13 for the above uses are preferably 7-25% in general, more preferably 8 to 20%. In the example of FIG. 1, the cladding rate of the brazing filler metal 12 is for example 10%, and the cladding rate of the sacrificial anode material 13 is for example 20%. The thickness of the brazing sheet 10 composed as described above is preferably 0.15-0.30 mm, more preferably 0.18-0.25 mm. In the example of FIG. 1, the thickness is for example 0.3 mm.

Next, the reasons for adding the constituent elements to the core material 11 and the sacrificial anode material 13 constituting the brazing sheet 10 of the embodiment, the ranges of the addition and preferable materials of the brazing filler metal 12 are explained.

[1. Core Material]

Si: 0.2-1.0 mass %

Si forms an Al—Mn—Si—, Al—Fe—Si— or Al—Fe—Mn—Si based intermetallic compound with Fe and Mn, and the intermetallic compound acts for dispersion strengthening or acts for solid solution strengthening by forming a solid solution with the matrix, thereby improving the material strength. Moreover, Si reacts with Mg and achieves an effect of improving the strength through aging precipitation of $Mg_2Si$ compound. The Si content is 0.2-1.0 mass % (simply indicated by "%" below, the same applies below). When the content is less than 0.2%, the effects are insufficient, while when the content exceeds 1.0%, the solidus temperature (melting point) of the core material decreases, and the deterioration of weldability due to local melting during welding and melting of the core material during brazing are more likely to occur. A preferable Si content is 0.2-0.5%.

Fe: 0.05-0.40%

Fe tends to form an intermetallic compound of a size which can be a recrystallization nucleus. The Fe content is 0.05-0.40%. Within the range, the crystal compounds after brazing become coarse compounds, and the diffusion of the brazing filler metal can be restricted effectively. When the content is less than 0.05%, use of high purity aluminum metal is required, resulting in high cost. When the content exceeds 0.40%, the crystal compounds after brazing become fine, and the brazing filler metal may diffuse. A preferable Fe content is 0.10-0.25%.

Cu: 0.4-1.2%

Cu exhibits an effect of improving the strength through solid solution strengthening. Also, Cu increases the potential differences from the sacrificial anode material and the fin by shifting the potential in the more noble direction and achieves an effect of improving the anti-corrosion effect by sacrificial anode effect. In addition, the strength is improved through aging precipitation of an Al—Mg—Cu based intermetallic compound. The Cu content is 0.4-1.2%. When the content is less than 0.4%, the effects are insufficient, while when the content exceeds 1.2%, grain boundary corrosion is more likely to occur, and the core material is more likely to melt due to the decrease of the melting point. Moreover, when the content exceeds 1.2%, the weldability deteriorates due to local melting during welding. A preferable Cu content is 0.5-1.0%.

Mn: 0.3-1.8%

Mn achieves effects of improving the strength, the brazing properties and the corrosion resistance. Also, Mn achieves an effect of shifting the potential in the more noble direction. The Mn content is 0.3-1.8%. When the content is less than 0.3%, the effects are insufficient, while when the content exceeds 1.8%, a giant intermetallic compound tends to be formed during casting, and the plasticity deteriorates. A preferable Mn content is 0.5-1.5%.

The core material further comprises one, two or more of Ti, Zr, Cr and V.

Ti: 0.02-0.30%

Ti achieves effects of improving the strength through solid solution strengthening and improving the corrosion resistance. The Ti content is 0.02-0.30%. When the content is less than 0.02%, the effects are insufficient, while when the content exceeds 0.30%, a giant intermetallic compound tends to be formed, and the plasticity deteriorates. A preferable Ti content is 0.10-0.20%.

Zr: 0.02-0.30%

Zr achieves an effect of improving the strength through solid solution strengthening. In addition, a fine Al—Zr based compound is precipitated, and Zr acts for the formation of coarse crystal compounds after brazing. The Zr content is 0.02-0.30%. When the content is less than 0.02%, the effects are insufficient, while when the content exceeds 0.30%, a giant intermetallic compound tends to be formed, and the plasticity deteriorates. A preferable Zr content is 0.10-0.20%.

Cr: 0.02-0.30%

Cr achieves effects of improving the strength through solid solution strengthening and improving the corrosion resistance. The Cr content is 0.02-0.30%. When the content is less than 0.02%, the effects are insufficient, while when the content exceeds 0.30%, a giant intermetallic compound tends to be formed, and the plasticity deteriorates. A preferable Cr content is 0.10-0.20%.

V: 0.02-0.30%

V achieves effects of improving the strength through solid solution strengthening and improving the corrosion resistance. The V content is 0.02-0.30%. When the content is less than 0.02%, the effects are insufficient, while when the content exceeds 0.30%, a giant intermetallic compound tends to be formed, and the plasticity deteriorates. A preferable V content is 0.10-0.20%.

Also, the core material may further comprise Mg.

Mg: 0.05-0.60%

Mg achieves an effect of improving the strength through aging precipitation by the formation of an Al—Mg—Cu based intermetallic compound and the formation of $Mg_2Si$ and $MgZn_2$. A preferable Mg content is 0.05-0.60%. When the content is less than 0.05%, the effect may not be sufficient. On the other hand, when the content exceeds 0.60%, the brazing properties deteriorate. Moreover, when the content exceeds 0.60%, segregation tends to occur, and the melting point of the core material decreases locally. Thus, the heat input of welding may cause local melting, and the weldability may deteriorate. A more preferable Mg content is 0.05-0.40%.

The alloy composition of the core material is as described above, but the core material may comprise Zn, B, Ni and the like as unavoidable impurities each in an amount of 0.05% or less and in a total amount of 0.15% or less.

[2. Sacrificial Anode Material]

Si: 0.05-0.50%

Si reacts with Mg which is added to the sacrificial anode material or the core material to form $Mg_2Si$ compound and thus improves the strength through aging precipitation. The Si content is 0.05-0.50%. When the content is less than 0.05%, the effect is insufficient. On the other hand, when the content exceeds 0.50%, the solidus temperature (melting point) of the sacrificial anode material decreases, and the deterioration of weldability due to local melting during welding and melting of the sacrificial anode material during brazing are more likely to occur. Also, since Si has an effect of shifting the potential in the more noble direction by forming a solid solution, Si shifts the potential of the sacrificial anode material in the more noble direction and deteriorates the sacrificial anode effect. A preferable Si content is 0.10-0.40%.

Fe: 0.01-0.30%

Fe forms a compound with Al and other elements in the aluminum alloy and deteriorates the corrosion resistance by acting as a cathode. Thus, the Fe content is preferably low, but high purity aluminum metal with a low Fe content increases the cost. Accordingly, a practical Fe content is 0.01-0.30%. A preferable Fe content is 0.05-0.25%.

Mg: 1.0-3.0%

Mg achieves an effect of improving the strength through aging precipitation by the formation of an Al—Mg—Cu based intermetallic compound and the formation of $Mg_2Si$ and $MgZn_2$. A preferable Mg content is 1.0-3.0%. When the content is less than 1.0%, the effect is insufficient. On the other hand, when the content exceeds 3.0%, the deterioration of the intermediate ability and melting of the sacrificial anode material due to the decrease in the solidus temperature (melting point) are more likely to occur, and segregation tends to occur. As a result, the melting point of the core material decreases locally, and the heat input of welding causes local melting, resulting in the deterioration of the weldability. A preferable Mg content is 1.2-2.5%.

Zn: 2.0-6.0%

Zn can shift the potential of the sacrificial anode material in the less noble direction and thus can increase the potential difference from the core material. As a result, Zn achieves an effect of improving the corrosion resistance by the sacrificial anode effect. Also, Zn exhibits an effect of improving the strength through aging precipitation of $MgZn_2$. The Zn content is 2.0-6.0%. When the content is less than 2.0%, the effects are insufficient, while when the content exceeds 6.0%, the corrosion rate increases, and the sacrificial anode material is lost at an early stage, resulting in the deterioration of the corrosion resistance. A preferable Zn content is 3.0-5.0%.

The sacrificial anode material may further comprise at least one of Ti and V.

Ti: 0.02-0.30%

Ti achieves effects of improving the strength through solid solution strengthening and improving the corrosion resistance. A preferable Ti content is 0.02-0.30%. When the content is less than 0.02%, the effects of improving the strength and the corrosion resistance may not be sufficient. On the other hand, when the content exceeds 0.30%, a giant intermetallic compound tends to be formed, and the plasticity may deteriorate. A more preferable Ti content is 0.10-0.20%.

V: 0.02-0.30%

V achieves effects of improving the strength through solid solution strengthening and improving the corrosion resistance. A preferable V content is 0.02-0.30%. When the content is less than 0.02%, the effects may not be sufficient. On the other hand, when the content exceeds 0.30%, a giant intermetallic compound tends to be formed, and the plasticity may deteriorate. Amore preferable V content is 0.10-0.20%.

The alloy composition of the sacrificial anode material is as described above, but the sacrificial anode material may comprise Cu, Mn, Zr, Cr, B, Ni and the like as unavoidable impurities each in an amount of 0.05% or less and in a total amount of 0.15% or less.

[3. Brazing Filler Metal]

A generally used Al—Si based alloy brazing filler metal can be used as the brazing filler metal, and the brazing filler metal is not particularly restricted. For example, it is preferable to use an alloy of JIS4343, 4045 or 4047 (Al-7 to 13% Si).

At least either Na or Sr may be added to make the Si compounds in the brazing filler metal fine. The respective contents are preferably 0.003-0.020%. More preferably, the respective contents are 0.005-0.015%.

[4. Al—Mg—Cu Based Intermetallic Compound at Interface Between Core Material and Sacrificial Anode Material]

In the aluminum alloy brazing sheet according to the invention, the number of Al—Mg—Cu based intermetallic compound at the interface between the core material and the sacrificial anode material in across section parallel to the longitudinal direction (direction of rolling) and along the thickness direction is controlled to 300 pieces/mm or less. The reasons are explained below.

The aluminum alloy brazing sheet according to the invention comprises Cu in the core material and Mg in the sacrificial anode material. During the heat input steps after cladding the core material with the sacrificial anode material by hot rolling and metallurgically bonding the materials, specifically, in the period after winding into a coil after hot rolling until the coil cools and during the subsequent annealing step, Cu in the core material diffuses into the sacrificial anode material, and Mg in the sacrificial anode material diffuses into the core material. The inventors have revealed that an Al—Mg—Cu based intermetallic compound is formed at the interface between the core material and the sacrificial anode material during the interdiffusion in the heat input steps. The melting point of the intermetallic compound is considerably lower than the melting point of an aluminum alloy, namely around 500° C. It has been found that, when electric resistance welding is conducted with many of the intermetallic compound existing at the interface between the core material and the sacrificial anode material, the intermetallic compound melts by the heat input of welding, and the sacrificial anode material peels from the core material at the interface.

Moreover, as a result of the investigation of the inventors, it has been found that, in order to restrict the phenomenon of such interface peeling, it is necessary to limit the density of the Al—Mg—Cu based intermetallic compound at the interface between the core material and the sacrificial anode material to a certain level or lower and to prevent continuous distribution of the intermetallic compound. Specifically, when the brazing sheet is in the form of a coil for example, the density of the Al—Mg—Cu based intermetallic compound at the interface between the core material and the sacrificial anode material in a cross section parallel to the longitudinal direction and along the thickness direction is limited to 300 pieces or less per unit length (mm) of the interface. When the density exceeds 300 pieces/mm, continuous distribution of the intermetallic compound occurs, and the phenomenon of peeling at the core material/sacrificial anode material interface arises during welding. The density is preferably 200 pieces/mm or less. The lower limit of the density is not particularly restricted but is automatically determined by the alloy compositions and the production method. In the invention, the lower limit is 50 pieces/mm.

There are two major methods for decreasing the density of the intermetallic compound: a method by heating to a temperature at which the intermetallic compound diffuses into an aluminum alloy to form a solid solution (solution treatment); and a method by limiting the heat input in the heat input steps in which the intermetallic compound is formed.

In the method by heating the intermetallic compound to a temperature at which the intermetallic compound diffuses into an aluminum alloy to form a solid solution, it is necessary to heat the aluminum alloy brazing sheet to a high temperature around 400-550° C., and the aluminum alloys are recrystallized when heated to the temperature. This method is not appropriate because the recrystallization causes weld cracking as described below. Thus, use of the method by limiting the heat input in the heat input steps in which the intermetallic compound is formed is effective for restricting both peeling during welding and weld cracking. A specific method for limiting the heat input is conducted by controlling the finish temperature of the hot rolling step described below and controlling the annealing temperature of the annealing step.

[5. Structures of Core Material and Sacrificial Anode Material]

In the aluminum alloy brazing sheet according to the invention, the core material and the sacrificial anode material have an unrecrystallized structure. The reasons are explained below.

When the core material and the sacrificial anode material are recrystallized in the annealing step and the like, the crystal grain boundaries collect the solid solution elements (Cu, Mg, Zn and the like) in the aluminum alloys as the crystal grain boundaries move, and the elements are segregated at the crystal grain boundaries at high concentrations. Since the solid solution elements decrease the melting point of an aluminum alloy, the melting point of a crystal grain boundary with segregated elements decreases. Thus, when a material comprising recrystallized core material and sacrificial anode material is subjected to electric resistance welding, the crystal grain boundaries melt first with the heat input of welding, and weld cracking occurs due to the stress applied when butting the end faces of a brazing sheet formed into a tube for example. In order to prevent the weld cracking, it is necessary that the core material and the sacrificial anode material have an unrecrystallized structure.

[6. Mechanical Properties of Material]

For welding, it is necessary to form the material into a tube and to accurately butt the end faces. When the mechanical properties of the material are outside the proper ranges, the material cannot be fabricated into an appropriate shape when the material is fabricated into a tube, and the weldability deteriorates. The 0.2% proof stress and the elongation of the material are important for the fabricability.

The 0.2% proof stress is preferably in the range of 140-200 N/mm$^2$. When the 0.2% proof stress is less than 140 N/mm$^2$, a problem arises since the ends of the material deform and the end faces do not fit each other when the end faces are butted for example. On the other hand, when the 0.2% proof stress exceeds 200 N/mm², springback occurs to a greater degree when forming into a tube, and this case also has a problem in that the end faces do not fit each other. The 0.2% proof stress is more preferably 150-190 N/mm².

The elongation is preferably 5% or more. When the elongation is less than 5%, local deformation tends to occur during the fabrication into a tube. The elongation is more preferably 10% or more. The upper limit of the elongation is not particularly restricted but is automatically determined by the alloy compositions and the production method. In the invention, the upper limit is 20%.

[7. Production Method of Aluminum Alloy Brazing Sheet]

Next, the method for producing the aluminum alloy brazing sheet according to the invention is explained.

The aluminum alloy brazing sheet according to the invention is produced by cladding an Al—Si based brazing filler metal on one surface of an alloy core material with the above composition and cladding a sacrificial anode material prepared from an alloy with the above composition on the other surface of the core material.

First, aluminum alloys with the desired compositions are each melted, cast and then homogenized when necessary to prepare aluminum alloys for the core material and the sacrificial anode material. To prepare the brazing filler metal, an aluminum alloy with the desired composition is melted and cast but is not homogenized.

General DC casting method and CC casting method are used as the casting method. To prepare the core material, the ingot is not homogenized or homogenized at 550° C. or lower. When the temperature exceeds 550° C., the Mn based intermetallic compound in the core material becomes a coarse compound. When the coarse Mn based intermetallic compound functions as a recrystallization nucleus during brazing, the crystal compounds of the core material after brazing become fine, and the deficiency of the diffusion of the brazing filler metal, where the brazing filler metal diffuses and erodes the crystal grain boundaries of the core material, tends to arise. When homogenization is conducted, a more preferable homogenization temperature of the core material is lower than 530° C. The lower limit of the homogenization temperature is 450° C. The homogenization time is 2-10 hours, preferably 3-8 hours. When the time is shorter than two hours, the effect for making the crystal compounds of the core material after brazing coarse compounds becomes insufficient, while when the time exceeds hours, the number of recrystallization nuclei during brazing increases, and the crystal compounds of the core material after brazing become fine.

Preferably, the ingot of the sacrificial anode material is not homogenized. The reasons are as follows. When the sacrificial anode material is homogenized, the Al—Fe— and Al—Fe—Si based intermetallic compounds in the sacrificial anode material grow. The grown intermetallic compounds are highly likely to remain in Al without melting also during brazing, and a stable phase of Mg₂Si and MgZn₂ tends to precipitate on the surfaces of the intermetallic compounds during the cooling intermediate after brazing. As a result, the amounts of Mg and Zn which do not contribute to aging precipitation increase, and the strength deteriorates.

Then, after facing the ingots of the core material, the sacrificial anode material and the brazing filler metal, the sacrificial anode material and the brazing filler metal are each rolled to the desired thicknesses by hot rolling. The temperatures of the hot rolling of the sacrificial anode material ingot and the brazing filler metal ingot are 380-500° C. The hot-rolled sacrificial anode material and brazing filler metal are combined with the core material ingot, and a clad material is prepared by heating the combined materials before hot rolling to 400-550° C. and then hot rolling the combined materials. When the heating temperature before the hot rolling is lower than 400° C., pressure bonding of the cladding material (sacrificial anode material) and the core material becomes difficult. On the other hand, when the heating temperature before the hot rolling exceeds 550° C., the Mn based intermetallic compound in the core material becomes a coarse compound, and the crystal compounds of the core material after brazing become fine. Also, a strong MgO oxide layer is formed on the surface of the sacrificial anode material, and pressure bonding of the core material and the sacrificial anode material becomes difficult during the hot rolling. A more preferable heating temperature before the hot rolling is 420-530° C. The heating time before the hot rolling is 1-10 hours, preferably 2-8 hours. When the time is shorter than one hour, the temperature of the combined materials may be uneven, and pressure bonding during the hot rolling becomes difficult, while when the time exceeds 10 hours, the number of recrystallization nuclei during brazing increases, and the crystal compounds of the core material after brazing become fine.

Furthermore, the hot-rolling start temperature is 400-530° C., and the hot-rolling finish temperature is 200-320° C. As described above, by controlling the finish temperature in this manner, the heat input which forms the Al—Mg—Cu based intermetallic compound can be restricted, and the density of the intermetallic compound can be decreased. That is, in the intermediates in which the coil which has been wound is held at a high temperature, the formation of the Al—Mg—Cu based compound at the core material/sacrificial anode material interface is restricted. When the hot-rolling finish temperature is lower than 200° C., problems such as burning of the rolling oil used for the hot rolling arise. When the hot-rolling finish temperature exceeds 320° C., the Al—Mg—Cu based intermetallic compound is formed at the core material/sacrificial anode material interface after winding the clad material into a coil, and the proportion of the continuous distribution of the intermetallic compound increases. A preferable finish temperature of the hot rolling is 230-300° C.

Next, the hot-rolled clad material is cold-rolled and annealed. In the case of batch annealing, the annealing temperature is 230-320° C., preferably 250-300° C. By controlling the annealing temperature in this manner, the heat input which forms the Al—Mg—Cu based intermetallic compound can be restricted, and the density of the compound can be decreased. That is, when the temperature exceeds 320° C., the Al—Mg—Cu based compound is formed at the core material/sacrificial anode material interface, and the proportion of the continuous distribution of the intermetallic compound increases. On the other hand, when the annealing temperature is lower than 230° C., the strength of the material improves, and the formability during welding deteriorates. The annealing holding time is one to eight hours, preferably two to five hours. When the annealing holding time is shorter than one hour, the temperature in the coil becomes uneven, and the mechanical properties of the material vary greatly. On the other hand, when the annealing holding time exceeds eight hours, Zn in the sacrificial anode material diffuses into the core material, and the corrosion resistance after brazing may deteriorate. In the case of continuous annealing using CAL, the annealing temperature is 250-400° C., preferably 280-380° C. The annealing holding time is 0-50 seconds, preferably 10-30 seconds. The reasons for limiting the upper and lower limits of the annealing temperature and the annealing time are the same as those for the batch annealing. In this regard, the annealing holding time of 0 second in the continuous annealing means that the material is cooled immediately after the temperature has reached the annealing temperature.

The annealing may be only final annealing which is conducted after cold rolling to the final thickness. On the other hand, a pattern including intermediate annealing during cold rolling, subsequent final cold rolling at a reduction of 5-40% and final annealing is also acceptable. In both of the patterns, the refining type of the material is H2n.

When the final annealing is not conducted, the 0.2% proof stress of the material becomes high, and the elongation of the material becomes small, resulting in the deterioration of the formability during welding. In order to control the 0.2% proof stress of the material and the elongation in the proper ranges, the intermediate annealing is preferably conducted in addition to the final annealing.

As the annealing method, batch annealing using a batch annealing furnace and continuous annealing using CAL are employed, but batch annealing is preferable in the invention. The reasons areas follow. As described above, it is necessary to keep the annealing temperature low in order to obtain the proper core material and sacrificial anode material structures and achieve the proper distribution of the intermetallic compound at the interface. In continuous annealing, however, the plate-passing time of annealing (annealing time) is short, and it is difficult to control the temperature of the whole aluminum alloy brazing sheet in the coil longitudinal and width directions even, during annealing at a low temperature.

The thickness of the aluminum alloy brazing sheet according to the invention and the cladding rates of the respective layers are not particularly restricted. For example, in the case of a tube material used for a radiator, a heater and the like described above, the brazing sheet may be thin with a thickness of about 0.3 mm or less, preferably around 0.15-0.3 mm. In this case, the cladding rates of the sacrificial anode material layer and the brazing filler metal layer are 5-20%. Also, when the brazing sheet is used as a tube material for an intercooler and the like, the brazing sheet with a thickness of around 0.2-0.8 mm can be produced. In this case, the cladding rates of the sacrificial anode material layer and the brazing filler metal layer are around 3-15%.

The aluminum alloy brazing sheet according to the invention explained above is thin but can exhibit excellent weldability and post-brazing strength. Therefore, according to the embodiment, an aluminum alloy brazing sheet which can be preferably used especially as a material constituting a fluid path for an automobile heat exchanger can be obtained.

EXAMPLES

Next, Examples of the aluminum alloy brazing sheet of the invention are specifically explained by comparing with Comparative Examples which are outside the claimed scope, but the invention is not restricted to the Examples.

First, core material alloys with the alloy compositions shown in Table 1 and sacrificial anode material alloys with the alloy compositions shown in Table 2 were each cast by metal mold casting and finished by facing both surfaces. In the alloy compositions in Table 1 and Table 2, "-" indicates that the value was the limit of detection or less, and the "balance" includes unavoidable impurities.

TABLE 1

| Alloy Symbol | Alloy Composition (mass %) | | | | | | | | | | |
|---|---|---|---|---|---|---|---|---|---|---|---|
| | Si | Fe | Cu | Mn | Mg | Zn | Ti | Zr | Cr | V | Al |
| A1 | 0.2 | 0.20 | 0.8 | 1.1 | — | — | 0.10 | — | — | — | Balance |
| A2 | 1.0 | 0.20 | 0.4 | 1.1 | — | — | — | 0.10 | — | — | Balance |
| A3 | 0.5 | 0.20 | 1.2 | 0.3 | — | — | — | — | 0.10 | — | Balance |
| A4 | 0.5 | 0.05 | 0.8 | 1.8 | — | — | — | — | — | 0.10 | Balance |
| A5 | 0.5 | 0.40 | 0.8 | 1.1 | — | — | 0.1 | 0.01 | 0.01 | 0.01 | Balance |
| A6 | 0.5 | 0.20 | 0.8 | 1.1 | — | — | 0.02 | — | — | — | Balance |
| A7 | 0.5 | 0.20 | 0.8 | 1.1 | — | — | 0.30 | 0.02 | — | — | Balance |
| A8 | 0.5 | 0.20 | 0.8 | 1.1 | — | — | — | 0.30 | 0.02 | — | Balance |
| A9 | 0.5 | 0.20 | 0.8 | 1.1 | — | — | — | — | 0.30 | 0.02 | Balance |
| A10 | 0.5 | 0.20 | 0.8 | 1.1 | — | — | — | — | — | 0.30 | Balance |
| A11 | 0.5 | 0.20 | 0.8 | 1.1 | 0.05 | — | — | — | — | — | Balance |
| A12 | 0.5 | 0.20 | 0.8 | 1.1 | 0.60 | — | — | — | — | — | Balance |
| A13 | 0.1 | 0.20 | 0.8 | 0.2 | — | — | 0.40 | — | — | — | Balance |
| A14 | 1.2 | 0.50 | 0.8 | 1.1 | — | — | — | 0.40 | — | — | Balance |
| A15 | 0.5 | 0.20 | 0.3 | 1.1 | — | — | — | — | 0.40 | — | Balance |
| A16 | 0.5 | 0.20 | 1.4 | 2.0 | — | — | 0.15 | — | — | 0.40 | Balance |
| A17 | 0.5 | 0.20 | 0.8 | 1.1 | 0.70 | — | — | — | — | — | Balance |

TABLE 2

| Alloy Symbol | Alloy Composition (mass %) | | | | | | | | | | |
|---|---|---|---|---|---|---|---|---|---|---|---|
| | Si | Fe | Cu | Mn | Mg | Zn | Ti | Zr | V | Cr | Al |
| B1 | 0.05 | 0.15 | — | — | 1.8 | 4.0 | — | — | — | — | Balance |
| B2 | 0.50 | 0.01 | — | — | 1.8 | 4.0 | — | — | — | — | Balance |
| B3 | 0.05 | 0.30 | — | — | 1.0 | 4.0 | — | — | — | — | Balance |
| B4 | 0.30 | 0.15 | — | — | 3.0 | 2.0 | — | — | — | — | Balance |
| B5 | 0.30 | 0.15 | — | — | 1.8 | 6.0 | — | — | — | — | Balance |
| B6 | 0.30 | 0.15 | — | — | 1.8 | 4.0 | 0.02 | — | — | — | Balance |
| B7 | 0.30 | 0.15 | — | — | 1.8 | 4.0 | 0.30 | — | 0.02 | — | Balance |
| B8 | 0.30 | 0.15 | — | — | 1.8 | 4.0 | — | — | 0.30 | — | Balance |
| B9 | 0.02 | 0.15 | — | — | 0.8 | 4.0 | — | — | — | — | Balance |
| B10 | 0.60 | 0.40 | — | — | 1.8 | 4.0 | 0.40 | — | — | — | Balance |
| B11 | 0.30 | 0.15 | — | — | 1.8 | 1.0 | — | — | 0.40 | — | Balance |
| B12 | 0.30 | 0.15 | — | — | 3.5 | 7.0 | — | — | — | — | Balance |

JIS4045 alloy was used for the brazing filler metal. The ingots of the brazing filler metal and the sacrificial anode materials were each rolled by hot rolling at 500° C. to the desired thicknesses, and the respective plate materials were prepared. The sacrificial anode materials were not homogenized.

The core material ingots were not homogenized. The hot-rolled brazing filler metal and each hot-rolled sacrificial anode material were clad on a core material with the combination of brazing filler metal-core material-sacrificial anode material. The cladding rate of the brazing filler metal was 10%, and the cladding rate of the sacrificial anode materials was 15%. Such clad materials were heated at 500° C. for two hours and then hot rolled under the conditions of a start temperature of 480° C. and the finish temperature shown in Table 3. Next, after cold rolling the hot-rolled materials, the cold-rolled materials were subjected to intermediate annealing in a batch annealing furnace under the conditions shown in Table 3 (intermediate annealing was not conducted in the production step 8) and to final cold rolling to the final thickness of 0.25 mm. Finally, final annealing was conducted in a batch annealing furnace under the conditions shown in Table 3 (final annealing was not conducted in the production steps 13 and 14), and sample materials of aluminum alloy brazing sheet (refining type: H2n) were prepared. When the intermediate annealing was conducted, the reduction from the intermediate annealing thickness to the final thickness was 30%. Because the production steps Nos. 13 and 14 did not include final annealing, the refining type of the plate materials was H1n.

With respect to the respective sample materials of the aluminum alloy brazing sheet (test materials Nos. 1 to 38) prepared as described above, the distribution of the Al—Mg—Cu based intermetallic compound, the structures of the core material and the sacrificial anode material, the mechanical properties (0.2% proof stress and elongation), the electric resistance welding property, the post-brazing strength, the brazing properties (fin joint ratio, erosion resistance and resistance to melting) and the corrosion resistance at the coolant side were evaluated by the following methods. The results are shown in Tables 4 to 6.

TABLE 3

| Production Steps No. | Finish Temperature of Hot Rolling | Intermediate Annealing | Final Annealing |
|---|---|---|---|
| 1 | 200° C. | 270° C. | 270° C. |
| 2 | 320° C. | 270° C. | 270° C. |
| 3 | 280° C. | 230° C. | 270° C. |
| 4 | 280° C. | 320° C. | 270° C. |
| 5 | 280° C. | 270° C. | 230° C. |
| 6 | 280° C. | 270° C. | 320° C. |
| 7 | 280° C. | 200° C. | 270° C. |
| 8 | 280° C. | — | 270° C. |
| 9 | 180° C. | 340° C. | 270° C. |
| 10 | 280° C. | 370° C. | 270° C. |
| 11 | 340° C. | 270° C. | 340° C. |
| 12 | 280° C. | 270° C. | 370° C. |
| 13 | 280° C. | 270° C. | — |
| 14 | 280° C. | 370° C. | — |

TABLE 4

| | | Alloy Symbol | | Distribution of Al—Mg—Cu | Structure | | Mechanical Properties | | | |
|---|---|---|---|---|---|---|---|---|---|---|
| | | Core Material | Sacrificial Anode Material | Production Step No. in Table 3 | based Compound pieces/mm | Core Material | Sacrificial Anode Material | 0.2% Proof Stress (N/mm²) | Mark | Elongation (%) | Mark |
| Example of Invention | 1 | A1 | B1 | 1 | 161 | Unrecrystallized | Unrecrystallized | 158 | ○ | 13 | ○ |
| | 2 | A2 | B1 | 1 | 125 | Unrecrystallized | Unrecrystallized | 159 | ○ | 15 | ○ |
| | 3 | A3 | B1 | 1 | 214 | Unrecrystallized | Unrecrystallized | 186 | ○ | 11 | ○ |
| | 4 | A4 | B1 | 1 | 161 | Unrecrystallized | Unrecrystallized | 172 | ○ | 13 | ○ |
| | 5 | A5 | B1 | 1 | 179 | Unrecrystallized | Unrecrystallized | 169 | ○ | 13 | ○ |
| | 6 | A6 | B1 | 1 | 161 | Unrecrystallized | Unrecrystallized | 170 | ○ | 13 | ○ |
| | 7 | A7 | B1 | 1 | 161 | Unrecrystallized | Unrecrystallized | 172 | ○ | 12 | ○ |
| | 8 | A8 | B1 | 1 | 179 | Unrecrystallized | Unrecrystallized | 171 | ○ | 12 | ○ |
| | 9 | A9 | B1 | 1 | 179 | Unrecrystallized | Unrecrystallized | 171 | ○ | 13 | ○ |
| | 10 | A10 | B1 | 1 | 179 | Unrecrystallized | Unrecrystallized | 173 | ○ | 12 | ○ |
| | 11 | A11 | B1 | 1 | 196 | Unrecrystallized | Unrecrystallized | 171 | ○ | 13 | ○ |
| | 12 | A12 | B1 | 1 | 250 | Unrecrystallized | Unrecrystallized | 203 | ○ | 10 | ○ |
| Comparative Example | 13 | A13 | B1 | 1 | 179 | Unrecrystallized | Unrecrystallized | 153 | ○ | 15 | ○ |
| | 14 | A14 | B1 | 1 | 169 | Unrecrystallized | Unrecrystallized | 183 | ○ | 11 | ○ |
| | 15 | A15 | B1 | 1 | 125 | Unrecrystallized | Unrecrystallized | 142 | ○ | 16 | ○ |
| | 16 | A16 | B1 | 1 | 268 | Unrecrystallized | Unrecrystallized | 207 | ○ | 8 | ○ |
| | 17 | A17 | B11 | 1 | 250 | Unrecrystallized | Unrecrystallized | 204 | ○ | 9 | ○ |

| | | Electric Resistance Welding Property | Strength after Brazing-Equivalent Heating | | Fin Joint Ratio | | Erosion Resistance and Melting Resistance | | | Corrosion Resistance at Coolant Side | Remarks |
|---|---|---|---|---|---|---|---|---|---|---|---|
| | | | Tensile Strength (N/mm²) | Mark | Joint Ratio (%) | Mark | Occurrence of Erosion | Occurrence of Melting of Material | Mark | | |
| Example of Invention | 1 | ○ | 171 | ○ | 100 | ○ | None | None | ○ | ○ | |
| | 2 | ○ | 183 | ○ | 100 | ○ | None | None | ○ | ○ | |
| | 3 | ○ | 190 | ○ | 100 | ○ | None | None | ○ | ○ | |
| | 4 | ○ | 181 | ○ | 100 | ○ | None | None | ○ | ○ | |
| | 5 | ○ | 177 | ○ | 100 | ○ | None | None | ○ | ○ | |

TABLE 4-continued

| | | | | | | | | | | | |
|---|---|---|---|---|---|---|---|---|---|---|---|
| | | 6 | ○ | 179 | ○ | 100 | ○ | None | None | ○ | ○ |
| | | 7 | ○ | 185 | ○ | 100 | ○ | None | None | ○ | ○ |
| | | 8 | ○ | 184 | ○ | 100 | ○ | None | None | ○ | ○ |
| | | 9 | ○ | 185 | ○ | 100 | ○ | None | None | ○ | ○ |
| | | 10 | ○ | 183 | ○ | 100 | ○ | None | None | ○ | ○ |
| | | 11 | ○ | 185 | ○ | 100 | ○ | None | None | ○ | ○ |
| | | 12 | ○ | 223 | ○ | 96 | ○ | None | None | ○ | ○ | |
| Comparative Example | 13 | ○ | 162 | X | 100 | ○ | None | None | ○ | ○ | G.C. Formation |
| | 14 | X | 208 | ○ | 100 | ○ | Occurred | Occurred | X | ○ | G.C. Formation |
| | 15 | ○ | 161 | X | 100 | ○ | None | None | ○ | ○ | G.C. Formation |
| | 16 | X | 206 | ○ | 100 | ○ | None | Occurred | X | ○ | G.C. Formation |
| | 17 | ○ | 232 | ○ | 89 | X | None | Occurred | X | X | G.C. Formation |

TABLE 5

| | | Alloy Symbol | | Production Step No. in Table 3 | Distribution of Al—Mg—Cu based Compound Pieces/mm | Structure | | Mechanical Properties of Material | | | |
|---|---|---|---|---|---|---|---|---|---|---|---|
| | | Core Material | Sacrificial Anode Material | | | Core Material | Sacrificial Anode Material | 0.2% Proof Stress (N/mm²) | Mark | Elongation (%) | Mark |
| Example of Invention | 18 | A6 | B2 | 1 | 161 | Unrecrystallized | Unrecrystallized | 171 | ○ | 13 | ○ |
| | 19 | A6 | B3 | 1 | 143 | Unrecrystallized | Unrecrystallized | 164 | ○ | 13 | ○ |
| | 20 | A6 | B4 | 1 | 250 | Unrecrystallized | Unrecrystallized | 180 | ○ | 14 | ○ |
| | 21 | A6 | B5 | 1 | 161 | Unrecrystallized | Unrecrystallized | 170 | ○ | 13 | ○ |
| | 22 | A6 | B6 | 1 | 179 | Unrecrystallized | Unrecrystallized | 170 | ○ | 13 | ○ |
| | 23 | A6 | B7 | 1 | 161 | Unrecrystallized | Unrecrystallized | 172 | ○ | 13 | ○ |
| | 24 | A6 | B8 | 1 | 179 | Unrecrystallized | Unrecrystallized | 171 | ○ | 12 | ○ |
| Comparative Example | 25 | A6 | B9 | 1 | 107 | Unrecrystallized | Unrecrystallized | 160 | ○ | 12 | ○ |
| | 26 | A6 | B10 | 1 | 179 | Unrecrystallized | Unrecrystallized | 173 | ○ | 13 | ○ |
| | 27 | A6 | B11 | 1 | 179 | Unrecrystallized | Unrecrystallized | 171 | ○ | 13 | ○ |
| | 28 | A6 | B12 | 1 | 286 | Unrecrystallized | Unrecrystallized | 184 | ○ | 14 | ○ |

| | | Electric Resistance Welding Property | Strength after Brazing-Equivalent Heating | | Fin Joint Ratio | | Erosion Resistance and Melting Resistance | | | Corrosion Resistance at Coolant Side | Remarks |
|---|---|---|---|---|---|---|---|---|---|---|---|
| | | | Tensile Strength (N/mm²) | Mark | Joint Ratio (%) | Mark | Occurrence of Erosion | Occurrence of Melting of Material | Mark | | |
| Example of Invention | 18 | ○ | 183 | ○ | 100 | ○ | None | None | ○ | ○ | |
| | 19 | ○ | 170 | ○ | 100 | ○ | None | None | ○ | ○ | |
| | 20 | ○ | 201 | ○ | 100 | ○ | None | None | ○ | ○ | |
| | 21 | ○ | 184 | ○ | 100 | ○ | None | None | ○ | ○ | |
| | 22 | ○ | 182 | ○ | 100 | ○ | None | None | ○ | ○ | |
| | 23 | ○ | 185 | ○ | 100 | ○ | None | None | ○ | ○ | |
| | 24 | ○ | 184 | ○ | 100 | ○ | None | None | ○ | ○ | |
| Comparative Example | 25 | ○ | 164 | X | 100 | ○ | None | None | ○ | ○ | |
| | 26 | X | 187 | ○ | 100 | ○ | None | None | ○ | X | G.C. Formation |
| | 27 | ○ | 185 | ○ | 100 | ○ | None | None | ○ | X | G.C. Formation |
| | 28 | X | 210 | ○ | 100 | ○ | None | Occurred | X | X | |

TABLE 6

| | | Alloy Symbol | | Production Step No. in Table 3 | Distribution of Al—Mg—Cu based Compound Pieces/mm | Structure | | Mechanical Properties of Material | | | |
|---|---|---|---|---|---|---|---|---|---|---|---|
| | | Core Material | Sacrificial Anode Material | | | Core Material | Sacrificial Anode Material | 0.2% Proof Stress (N/mm²) | Mark | Elongation (%) | Mark |
| Example of Invention | 29 | A1 | B1 | 2 | 268 | Unrecrystallized | Unrecrystallized | 161 | ○ | 14 | ○ |
| | 30 | A1 | B1 | 3 | 179 | Unrecrystallized | Unrecrystallized | 170 | ○ | 12 | ○ |
| | 31 | A1 | B1 | 4 | 268 | Unrecrystallized | Unrecrystallized | 145 | ○ | 14 | ○ |
| | 32 | A1 | B1 | 5 | 161 | Unrecrystallized | Unrecrystallized | 176 | ○ | 12 | ○ |
| | 33 | A1 | B1 | 6 | 286 | Unrecrystallized | Unrecrystallized | 142 | ○ | 15 | ○ |
| | 34 | A3 | B1 | 7 | 196 | Unrecrystallized | Unrecrystallized | 192 | ○ | 11 | ○ |
| | 35 | A3 | B1 | 8 | 179 | Unrecrystallized | Unrecrystallized | 197 | ○ | 10 | ○ |
| Comparative Example | 36 | A1 | B1 | 9 | 321 | Unrecrystallized | Recrystallized | 140 | ○ | 16 | ○ |
| | 37 | A1 | B1 | 10 | 339 | Recrystallized | Recrystallized | 151 | ○ | 7 | ○ |
| | 38 | A1 | B1 | 11 | 339 | Unrecrystallized | Recrystallized | 138 | X | 16 | ○ |
| | 39 | A1 | B1 | 12 | 357 | Recrystallized | Recrystallized | 68 | X | 11 | ○ |
| | 40 | A1 | B1 | 13 | 143 | Unrecrystallized | Unrecrystallized | 235 | X | 4 | X |
| | 41 | A1 | B1 | 14 | 321 | Recrystallized | Recrystallized | 220 | X | 2 | X |

| | | Electric Resistance Welding Property | Strength after Brazing-Equivalent Heating | | Fin Joint Ratio | | Erosion Resistance and Melting Resistance | | | Corrosion Resistance at Coolant Side | Remarks |
|---|---|---|---|---|---|---|---|---|---|---|---|
| | | | Tensile Strength (N/mm²) | Mark | Joint Ratio (%) | Mark | Occurrence of Erosion | Occurrence of Melting of Material | Mark | | |
| Example of Invention | 29 | ○ | 170 | ○ | 100 | ○ | None | None | ○ | ○ | |
| | 30 | ○ | 173 | ○ | 100 | ○ | None | None | ○ | ○ | |
| | 31 | ○ | 170 | ○ | 100 | ○ | None | None | ○ | ○ | |
| | 32 | ○ | 172 | ○ | 100 | ○ | None | None | ○ | ○ | |
| | 33 | ○ | 172 | ○ | 100 | ○ | None | None | ○ | ○ | |
| | 34 | ○ | 187 | ○ | 100 | ○ | None | None | ○ | ○ | |
| | 35 | ○ | 190 | ○ | 100 | ○ | None | None | ○ | ○ | |
| Comparative Example | 36 | X | 171 | ○ | 100 | ○ | None | None | ○ | ○ | |
| | 37 | X | 174 | ○ | 100 | ○ | None | None | ○ | ○ | |
| | 38 | X | 172 | ○ | 100 | ○ | None | None | ○ | ○ | |
| | 39 | X | 174 | ○ | 100 | ○ | None | None | ○ | ○ | |
| | 40 | X | 173 | ○ | 100 | ○ | None | None | ○ | ○ | |
| | 41 | X | 170 | ○ | 100 | ○ | None | None | ○ | ○ | |

[a] Distribution Density of Al—Mg—Cu based Intermetallic Compound (Pieces/mm):

1. Cross sections of the prepared sample materials which were parallel to the longitudinal direction (direction of rolling) of the coil and along the thickness direction were polished, and the core material/sacrificial anode material interfaces were observed using a scanning electron microscope. Thus, the distribution densities of the Al—Mg—Cu based intermetallic compound were measured. Distribution densities were measured at three points for each sample material, and the arithmetic mean was regarded as the distribution density.

[b] Structures of Core Material and Sacrificial Anode Material:

After mirror polishing cross sections of the prepared sample materials which were parallel to the longitudinal direction (direction of rolling) of the coil and along the thickness direction, Barker etching was conducted, and the structures of the core materials and the sacrificial anode materials were observed using an optical microscope. When recrystallized compounds were formed, the layer was determined to have a recrystallized structure. When recrystallized compounds were not formed and a fibrous structure was observed, the layer was determined to have an unrecrystallized structure.

[c] Mechanical Properties <0.2% Proof Stress (N/mm²) and Elongation (%)>:

A tensile test was conducted under the conditions of a speed of tensile testing of 10 mm/min and a gauge length of 50 mm according to JIS Z2241 at normal temperature, and the 0.2% proof stress (N/mm²) and the elongation (%) were measured.

[d] Electric Resistance Welding Property:

A coil material for electric resistance welding was cut out of the coil of each prepared sample material by slitting orthogonally to the longitudinal direction (direction of rolling) in such a manner that the width along the longitudinal direction became 35 mm. The edges of the coil material in the length direction were bonded by electric resistance welding, and a flat tube with a width of 16 mm was prepared. The cross section of the obtained tube was observed with an optical microscope (magnification of 200), and it was observed as to whether weld cracking and peeling of the sacrificial anode material occurred. In addition, a pressure test of each flat tube was conducted, and the pressure resistance (the strength at which the tube broke) was measured. A sample material was given an evaluation mark "○" indicating excellent electric resistance welding property, when neither weld cracking nor peeling of the sacrificial anode material was observed and the pressure resistance was 5.0 MPa or more. On the other hand, a sample material was given an evaluation mark "×" indicating insufficient electric resistance welding property, when at least one of the two cases, namely a case where either weld cracking or peeling of the sacrificial anode material occurred and a case where the pressure resistance was less than 5.0 MPa, applied to the sample.

[e] Tensile Strength (N/Mm$^2$) after Brazing:

The prepared sample materials were subjected to brazing-equivalent heating at 600° C. for three minutes, then cooled at a cooling rate of 50° C./min and then left at room temperature for a week. The samples were subjected to a tensile test under the conditions of a speed of tensile testing of 10 mm/min and a gauge length of 50 mm according to JIS Z2241 at normal temperature, and the tensile strengths were measured. A sample was given an evaluation mark "○" when the tensile strength was 170 N/mm$^2$ or more and an evaluation mark "×" when the tensile strength was less than 170 N/mm$^2$.

[f] Fin Joint Ratio (Brazing Property):

An alloy fin material prepared by adding 2.5% of Zn to JIS3003 alloy was corrugated and placed on the brazing filler metal side of the brazing sheet sample materials. Then, the materials were dipped in a 10% fluoride flux suspension, dried at 200° C. and then subjected to braze heating at 600° C. for three minutes, and test cores were prepared. The ratio of the joined ridges of the fin in a test core to all of the ridges of the fin was regarded as the fin joint ratio. A sample material was given an evaluation mark "○" indicating excellent brazing property when the fin joint ratio was 95% or more and an evaluation mark "×" indicating insufficient brazing property when the fin joint ratio was less than 95%.

[g] Erosion Resistance and Resistance to Melting (Brazing Properties):

Micro-observation of the cross sections of the test cores prepared in [f] was conducted using an optical microscope, and it was observed as to whether erosion (diffusion of the brazing filler metal) of the core material and the sacrificial anode material and melting of the material occurred. A sample was given an evaluation mark "○" when neither erosion nor melting of the material occurred and an evaluation mark "×" when either or both of erosion and melting of the material occurred.

[h] Evaluation of Corrosion Resistance at Coolant Side: (Coolant/Refrigerant Side of Heat Exchanger)

Using brazing sheet sample materials similar to the tensile test samples described in [f], the corrosion resistance at the coolant (refrigerant) side of a heat exchanger was evaluated as follows. After braze heating at 600° C. for three minutes, the brazing filler metal side was sealed, and a cyclic dipping test with a cycle of eight hours in high temperature water at 88° C. containing 500 ppm Cl$^-$, 100 ppm SO$_4^{2-}$ and 10 ppm Cu$^{2+}$ and 16 hours of leaving at room temperature was conducted for three months. Then, the maximum pitting corrosion depths of the sample materials were measured. A sample material was given an evaluation mark "○" when the maximum pitting corrosion depth was 0.1 mm or less and an evaluation mark "×" when the maximum pitting corrosion depth exceeded 0.1 mm.

Examples 1 to 12, 18 to 24 and 29 to 35 of the invention had appropriate distribution of the Al—Mg—Cu based intermetallic compound, and the structures of the core materials and the sacrificial anode materials were appropriate. The mechanical properties (0.2% proof stress and elongation) of the materials were in the proper ranges. The weldability and the electric resistance welding properties were excellent, and the tensile strengths after brazing were high, namely 170 N/mm$^2$ or more. The fin joint ratios were high, and the erosion resistance and the resistance to melting were also excellent. In addition, the corrosion resistance of the sacrificial material surfaces (the coolant side) was excellent.

On the contrary, the results of the Comparative Examples were as follows.

In this regard, because the recrystallization temperature of the sacrificial anode material is lower than that of the core material with respect to the core material and sacrificial anode material alloys of the invention, a sample material of a combination of a sacrificial anode material with an unrecrystallized structure and a core material with a recrystallized structure could not be prepared under the same annealing conditions.

In Comparative Example 13, since the Si content of the core material was too low and the Mn content was also too low, the post-brazing strength was poor. Also, since the Ti content was too high, a giant intermetallic compound (G. C.) was formed.

In Comparative Example 14, since the Si content of the core material was too high, local melting occurred during welding, and the electric resistance welding property was not at an acceptable level. Moreover, the melting point of the core material decreased, and the material melted during brazing. Furthermore, since the Fe content of the core material was too high and the crystal compounds of the core material after brazing were fine, erosion occurred. In addition, since the Zr content was too high, a giant intermetallic compound was formed.

In Comparative Example 15, since the Cu content of the core material was too low, the post-brazing strength was poor. Moreover, since the Cr content was too high, a giant intermetallic compound was formed.

In Comparative Example 16, since the Cu content of the core material was too high, local melting occurred during welding, and the electric resistance welding property was not at an acceptable level. Moreover, the melting point of the core material decreased, and the material melted during brazing. Furthermore, since the V content was too high, a giant intermetallic compound was formed.

In Comparative Example 17, since the Mg content of the core material was too high, the fin joint ratio was low. Also, since the Zn content of the sacrificial anode material was too low, the corrosion resistance at the coolant side was insufficient. Moreover, since the V content of the sacrificial anode material was too high, a giant intermetallic compound was formed. Furthermore, since the Mg content of the core material was too high, the melting point of the core material decreased, and the material melted during brazing.

In Comparative Example 25, since the Si and Mg contents of the sacrificial anode material were too low, the post-brazing strength was poor.

In Comparative Example 26, since the Fe content of the sacrificial anode material was too high and the Ti content was too high, a giant intermetallic compound was formed, and the corrosion resistance at the coolant side was inferior. Moreover, since the Si content of the sacrificial anode material was too high, local melting occurred during welding. As a result, the electric resistance welding property was inferior.

In Comparative Example 27, since the Zn content of the sacrificial anode material was too low and the V content was too high, a giant intermetallic compound was formed. As a result, the corrosion resistance at the coolant side was inferior.

In Comparative Example 28, since the Mg content of the sacrificial anode material was too high, local melting occurred during welding, and the electric resistance welding property was not at an acceptable level. Moreover, the melting point of the sacrificial anode material decreased, and the material melted during brazing. Thus, the corrosion resistance at the coolant side was inferior.

In Comparative Example 36, since the finish temperature of the hot rolling was too low, the rolling oil burned. Also, since the temperature of the intermediate annealing was too high, the density of the Al—Mg—Cu based intermetallic compound formed at the core material/sacrificial anode material interface was high, and the sacrificial anode material peeled off during welding. Thus, the electric resistance welding property was not at an acceptable level. In addition, the sacrificial anode material had a recrystallized structure, and intergranular cracking occurred during welding. This was also a cause of the electric resistance welding property not being at an acceptable level.

In Comparative Example 37, the temperature of the intermediate annealing was too high. As a result, the density of the Al—Mg—Cu based intermetallic compound formed at the core material/sacrificial anode material interface was high, and the sacrificial anode material peeled off during welding. Thus, the electric resistance welding property was not at an acceptable level. In addition, the core material and the sacrificial anode material had a recrystallized structure, and intergranular cracking occurred during welding. This was also a cause of the electric resistance welding property not being at an acceptable level.

In Comparative Example 38, the finish temperature of the hot rolling was too high, and the temperature of the final annealing was too high. As a result, the density of the Al—Mg—Cu based intermetallic compound formed at the core material/sacrificial anode material interface was high, and the sacrificial anode material peeled off during welding. Also, the sacrificial anode material had a recrystallized structure, and intergranular cracking occurred during welding. Thus, the electric resistance welding property was not at an acceptable level. Moreover, since the 0.2% proof stress was low, the accuracy in butting the end faces of the material during welding deteriorated. This was also a cause of the electric resistance welding property not being at an acceptable level.

In Comparative Example 39, the temperature of the final annealing was too high. As a result, the density of the Al—Mg—Cu based intermetallic compound formed at the core material/sacrificial anode material interface was high, and the sacrificial anode material peeled off during welding. Thus, the electric resistance welding property was not at an acceptable level. Moreover, the core material and the sacrificial anode material had a recrystallized structure, and intergranular cracking occurred during welding. This was also a cause of the electric resistance welding property not being at an acceptable level. Furthermore, since the 0.2% proof stress was low, the accuracy in butting the end faces of the material during welding deteriorated. This was also a cause of the electric resistance welding property not being at an acceptable level.

In Comparative Example 40, final annealing was not conducted. As a result, the 0.2% proof stress was high, and the elongation was small. Thus, the electric resistance welding property was not at an acceptable level.

In Comparative Example 41, the temperature of the intermediate annealing was too high, and final annealing was not conducted. As a result, the density of the Al—Mg—Cu based intermetallic compound formed at the core material/sacrificial anode material interface was high, and the sacrificial anode material peeled off during welding. Thus, the electric resistance welding property was not at an acceptable level. Moreover, the core material and the sacrificial anode material had a recrystallized structure, and intergranular cracking occurred during welding. This was also a cause of the electric resistance welding property not being at an acceptable level. Furthermore, the 0.2% proof stress was high, and the elongation was small. Thus, the electric resistance welding property was not at an acceptable level.

INDUSTRIAL APPLICABILITY

According to the invention, an aluminum alloy brazing sheet which is thin but has excellent weldability and post-brazing strength is obtained. A heat exchanger for an automobile and the like using the aluminum alloy brazing sheet is light and has excellent thermal conductivity, and the post-brazing strength is excellent. Therefore, the lifetime of a heat exchanger can be prolonged.

The invention claimed is:

1. An aluminum alloy brazing sheet having a core material comprising an aluminum alloy, an Al—Si based brazing filler metal clad on one surface of the core material and a sacrificial anode material clad on the other surface of the core material,
wherein the core material comprises an aluminum alloy comprising Si:0.2-1.0 mass %, Fe:0.05-0.40 mass %, Cu:0.4-1.2 mass %, Mn:0.3 to 1.8 mass %, one, two or more selected from Ti:0.02-0.30 mass %, Zr:0.02-0.30 mass %, Cr:0.02-0.30 mass % and V:0.02-0.30 mass % and a balance of Al and unavoidable impurities,
the sacrificial anode material comprises an aluminum alloy comprising Si:0.05-0.50 mass %, Fe:0.01-0.30 mass %, Mg:1.0-3.0 mass %, Zn:2.0-0.60 mass % and a balance of Al and unavoidable impurities,
in a cross section parallel to the longitudinal direction and along the thickness direction, the interface between the core material and the sacrificial anode material includes 300 pieces/mm or less of an Al—Mg—Cu based intermetallic compound, and
the core material and the sacrificial anode material have an unrecrystallized structure.

2. The aluminum alloy brazing sheet according to claim 1, wherein the core material further comprises Mg:0.05-0.60 mass %.

3. The aluminum alloy brazing sheet according to claim 1, wherein the sacrificial anode material further comprises at least one of Ti:0.02-0.30% and V:0.02-0.30%.

4. The aluminum alloy brazing sheet according to claim 1, wherein the 0.2 % proof stress is 140 -200 N/mm$^2$, and the elongation percentage is 5% or more.

5. A method for producing the aluminum alloy brazing sheet according to claim 1, comprising a step of casting the aluminum alloys for the core material, the sacrificial anode material and the brazing filler metal, respectively, a cladding step of cladding the sacrificial anode material on one surface of the core material and cladding the brazing filler metal on the other surface, a step of heating a clad material, a hot rolling step, a cold rolling step and an annealing step,
wherein the annealing step includes both of intermediate annealing during the cold rolling step and final annealing after the cold rolling step, or only of the final annealing,
a finish temperature of the hot rolling step is 200 -320° C., and
the annealing of the intermediate annealing and the final annealing is batch annealing, and annealing temperatures of the intermediate annealing and the final annealing are 230 -320° C., and the annealing holding time for the batch annealing is 1-10 hours.

6. The method for producing the aluminum alloy brazing sheet according to claim 5, further comprising a homogenization treatment step of homogenizing an ingot of the core material at 550° C. or lower.

7. The method for producing the aluminum alloy brazing sheet according to claim 5, wherein the clad material is heated at 400-550° C. for 1 to 10 hours before the hot rolling step.

8. The method for producing the aluminum alloy brazing sheet according to claim 5, wherein a start temperature of the hot rolling step is 400-530° C.

* * * * *